Oct. 23, 1923.

L. A. M. CORSET 1,471,831

INDICATOR WITH MECHANICAL TRANSMISSION TO A DISTANCE

Filed Sept. 2, 1921

Inventor
Lucien A. M. Corset

Patented Oct. 23, 1923.

1,471,831

UNITED STATES PATENT OFFICE

LUCIEN ALFRED MAURICE CORSET, OF PARIS, FRANCE.

INDICATOR WITH MECHANICAL TRANSMISSION TO A DISTANCE.

Application filed September 2, 1921. Serial No. 493,032.

*To all whom it may concern:*

Be it known that I, LUCIEN ALFRED MAURICE CORSET, a citizen of the French Republic, and resident of 29 Boulevard de Grenelle, in the city of Paris and Republic of France, have invented certain new and useful Indicators with Mechanical Transmission to a Distance (for which I have filed application in France September 23, 1918, and February 6, 1919), of which the following is a specification.

The principal object of the present invention is to provide a transmission device particularly adapted to transmit a thrust from one end of a flexible transmitting line to the opposite end, and is characterized by a flexible tube in which a plurality of small push rods are placed in end to end contacting relation and are so constructed and arranged that they will function perfectly under all conditions of transverse flexure of the outer tube.

Another object is to so construct the push rods that the frictional effect between the rods and the interior of the tube will be reduced to a minimum.

Considered in its most specific aspects, this invention relates to a thrust transmitting device particularly adapted for application to a liquid containing reservoir such as a gasoline tank of an automobile for indicating the level thereof upon a suitable indicating instrument placed as for example upon the instrument board of the machine.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claim hereunto appended.

In the drawings forming a portion of this specification.

Figure 1:
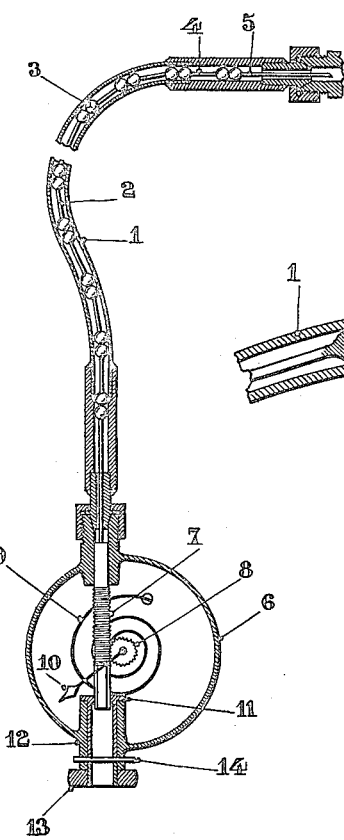
Fig. 1 is a sectional view partly broken away showing a form of constructing the push rods and illustrating the manner in which the thrust of the rods is delivered to an indicating device.

As shown in Fig. 1, within the outer hollow metallic flexible tube 1, is contained a number of push rods shaped like a dumb bell consisting of an elongated central rod 2, having at each end a ball like member 3, the diameters of which are somewhat smaller than the interior diameter of the tube 1. As shown in Fig. 1, the extreme push rod 4 is actuated by a rod 5, which is suitably connected to a float or other convenient mechanism situated in the liquid reservoir or in any other apparatus whose variations it is desired to register.

The indicating mechanism illustrated in Fig. 1 consists of a casing 6, provided at its lower end with a sleeve 12, in which is rotably mounted a socket member 11. The end of the socket member has slidingly received therein one extremity of a threaded bar 7, the other end of which is connected to a rod which extends into and contacts with the push rod at the extreme end of the thrust transmitting device. The threaded bar 7 meshes with a small pinion 8 and acts as a sliding rack to actuate the pinion 8 when a longitudinal thrust is communicated to the bar through the transmitting system. Fixedly secured upon the same shaft upon which the pinion 8 is mounted is an indicating needle 10, adapted to travel over a suitable indicating scale (not shown). A spiral spring 9 is provided to normally rotate the pinion 8 in a direction opposite to the thrust of the push rods.

The socket 11 is provided with an adjusting wheel 13, by means of which the socket may be turned to adjust the needle 10 to a zero position when the device is installed and the threaded rod 7 is hexagonal in cross section, the upper end of the socket having therein a hole of similar configuration in order that the threaded rod will be turned when the socket is rotated. The socket 11 is provided with a plurality of holes about its circumference through which a locking pin 14 may be inserted to lock the socket in a given position.

Figure 2:
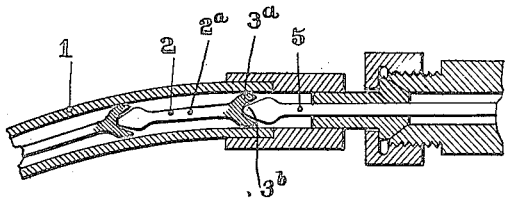
Fig. 2 is a sectional detail of a modified and preferred form of push rods.

As shown in Fig. 2, the push rods consist of elongated central portion 2ª terminating at one end in an enlarged head 3ª, the outer diameter of which is somewhat less than the inner diameter of the tube and the end portion of the head 3ª is provided with a cup shaped recess 3ᵇ. The other end of the elongated rod terminates in an enlarged substantially ellipsoidal shaped head and the rods are arranged within the tube 1 with an ellipsoidal head received within and contacting with the adjacent cup shaped recess 3$^b$ of the adjacent rod. In this way it will be seen that the frictional contact between the sides of the rods and the inside of the tube is reduced to one half the amount of frictional contact. In the modification shown in Fig. 1, it will be obvious that in a device of this character where great accuracy is required that the production of friction is of considerable importance and that a device constructed in accordance with the modification shown in Fig. 2 would be practical for a great variety of uses where it is desired to register at a distant point, the variations of pressures, temperatures, number of revolutions, or etc.

Having thus described my invention, what I claim as new and desire to secure by Letters Patent of the United States, is:—

A thrust transmitting device comprising a hollow flexible outer casing and a flexible thrust transmission mechanism enclosed in said casing consisting of a series of short push rods, each of said push rods having an elongated central portion terminating at one end in an enlarged head constructed and arranged to have a peripheral line contact with the inner surface of said casing, said head provided with a cup shaped recess and terminating at its other end in an enlarged substantially ellipsoidal shaped head of smaller transverse dimensions than said casing, said push rods being arranged in end to end relation with the ellipsoidal shaped head received within and in contact with said cup shaped recess, whereby transverse flexure of said device is permitted and longitudinal displacement of one of the end rods of said series will transmit a thrust along the entire series and frictional contact between said rods and casing will be confined to a single line contact at one end only of each push rod.

Signed at Paris, France, this 13th day of August, A. D., 1921.

LUCIEN ALFRED MAURICE CORSET.